United States Patent [19]

Cassano

[11] Patent Number: 4,526,775
[45] Date of Patent: Jul. 2, 1985

[54] OXYGEN PRODUCTION BY MOLTEN ALKALI METAL SALTS USING MULTIPLE ABSORPTION-DESORPTION CYCLES

[75] Inventor: Anthony A. Cassano, Allentown, Pa.

[73] Assignee: Air Products and Chemicals, Inc., Allentown, Pa.

[21] Appl. No.: 583,090

[22] Filed: Feb. 23, 1984

[51] Int. Cl.³ ............................................. C01B 13/00
[52] U.S. Cl. ...................................... 423/579; 55/58; 55/68; 423/219
[58] Field of Search ............... 55/25, 58, 68; 423/219, 423/579

[56] References Cited

U.S. PATENT DOCUMENTS

| | | | |
|---|---|---|---|
| 1,120,436 | 12/1914 | Bergfield | 423/579 |
| 2,418,402 | 4/1947 | Gorin | 423/579 |
| 4,132,766 | 1/1979 | Erickson | 423/579 |
| 4,234,322 | 11/1980 | De Meyer et al. | 55/25 |
| 4,287,170 | 9/1981 | Erickson | 423/579 |
| 4,340,578 | 7/1982 | Erickson | 423/579 |

OTHER PUBLICATIONS

Moriarty, "The Effects of Catalytic or Promoter Oxides on the Brin Process", *Iowa Academy of Sciences, Proceedings*, vol. 77, (Apr. 10, 1971), pp. 360–378.

*Primary Examiner*—John Doll
*Assistant Examiner*—Wayne A. Langel
*Attorney, Agent, or Firm*—Geoffrey L. Chase; James C. Simmons; E. Eugene Innis

[57] ABSTRACT

A continuous chemical air separation is performed wherein oxygen is recovered with a molten alkali metal salt oxygen acceptor in a series of absorption zones which are connected to a plurality of desorption zones operated in separate parallel cycles with the absorption zones. A greater recovery of high pressure oxygen is achieved at reduced power requirements and capital costs.

11 Claims, 3 Drawing Figures

OXYGEN PRODUCTION BY MOLTEN ALKALI METAL SALTS USING MULTIPLE ABSORPTION-DESORPTION CYCLES

The government of the United States of America has rights in this invention pursuant to Contract No. DE-AC07-82CE40544 awarded by the U.S. Department of Energy.

TECHNICAL FIELD

The present invention is directed to the separation of air in a chemical process using an oxygen acceptor to absorb oxygen by oxidation and to recover the oxygen by desorption under reduced pressure. More particularly, the present invention is directed to the production of oxygen from air in a series of chemical oxygen absorption stages using an alkali metal nitrite and nitrate mixture wherein desorption occurs separately for each stage of absorption in a reduced pressure desorption zone.

BACKGROUND OF THE PRIOR ART

The separation of air has long been practiced using adsorption and cryogenic techniques. These techniques have been successful in recovering large percentages of the constituents of air, namely; nitrogen and oxygen. However, adsorption and cryogenic techniques are highly energy intensive because of the requirements of high pressure and extremely low temperature, respectively.

It has been known to separate oxygen from nitrogen with various chemical media. Numerous chemical interactions of oxygen from air are known to occur in a nonreversible manner. Additional chemical reactions with oxygen from air have been known to occur in a reversible manner. However, most of these reversible interactions of chemical agents with oxygen are sufficient to recover only a relatively small percentage of the oxygen, or the recovery techniques are less than desirable for a commercial continuous operation. The use of alkali metal nitrites and nitrates in combination have been known to provide a viable alternative for the separation of oxygen from air in a reversible chemical reaction.

In U.S. Pat. No. 4,132,766, a process for the separation of oxygen from air in a regenerative chemical process is set forth. Air is contacted with a molten alkali metal salt, which constitutes an oxygen acceptor. The oxidized oxygen acceptor is removed and reduced in pressure to regenerate free oxygen from the acceptor. The regenerated acceptor can then be recycled for further renewed oxidation.

In U.S. Pat. No. 4,287,170, a process is set forth for the recovery of nitrogen and oxygen separately from air. The process utilizes a first absorption and desorption cycle in which oxygen oxidizes a molten alkali metal salt mixture, and the salt mixture is subsequently depressurized to drive off the recovered oxygen. The effluent from the absorption zone, which contains residual oxygen, is then passed to a second absorption zone in which residual oxygen is removed by contact with a scavenger, such as manganese oxide. The effluent from this absorption zone constitutes a commercially pure nitrogen product. The oxidized scavenger is reduced by contact with a reducing gas which produces an exhaust effluent containing residual oxygen and reducing gas in a mixture as a by-product of impure composition.

U.S. Pat. No. 4,340,578 discloses another process for the separation of air into oxygen and an oxygen-depleted stream, wherein air is compressed, heated and contacted with an alkali metal salt mixture to oxidize the salt mixture and produce an oxygen-depleted effluent stream. The oxidized salt mixture is then depressurized in a desorption zone to recover an oxygen product. The regenerated salt mixture is recycled to the absorber or contact zone. The effluent from the absorption zone, which constitutes oxygen-depleted gas is then combusted with fuel and expanded and heat exchanged against process streams in order to provide the necessary heat for the reactions and the necessary power for the compression of feed air and product oxygen. The patent indicates that multiple stages of absorption and desorption are contemplated, but the exact flowscheme for such stages of absorption and desorption are not set forth.

The present invention provides an improved process for the recovery of oxygen from air using the molten alkali metal salt mixtures of the above prior art, wherein a greater recovery of high pressure oxygen is achieved from that of the prior art utilizing a unique system of parallel desorption which achieves an improved energy efficiency at lower capital cost as set forth below.

BRIEF SUMMARY OF THE INVENTION

The present invention is directed to a process for the continuous chemical separation of air into oxygen and nitrogen in which pressurized air is contacted in an absorption zone with an oxygen acceptor which becomes oxidized, the oxidized oxygen acceptor is separately decomposed by pressure reduction in a desorption zone to yield oxygen and regenerated oxygen acceptor and the regenerated oxygen acceptor is recycled to the absorption zone, the invention characterized in that pressurized air is separated using the oxygen acceptor in a plurality of staged absorption zones in which each zone is connected to a separate desorption zone for the recovery of oxygen and the regeneration of oxygen acceptor.

Optionally, the separation can be performed in two stages of absorption with attendant separate desorption zones. Alternately, the first absorption zone may include two attendant desorption stages connected in series in order to recover relatively high pressure oxygen and relatively intermediate pressure oxygen in that discrete desorption zone.

An advantage of the present process is the recovery of a commercially pure nitrogen product as an effluent stream from the absorption zone of the process.

Preferably the oxygen acceptor comprises a molten solution of alkali metal nitrite and alkali metal nitrate.

Preferably the separation is performed in three absorption zones connected in series, with each absorption zone having an attendant separate desorption zone which operates in parallel with each other desorption zone.

Preferably the chemical separation process recovers oxygen at a high pressure of approximately 15 psia which constitutes approximately 25% of the air treated, an intermediate pressure at approximately 6 psia constituting approximately 52% of the air treated and a low pressure of approximately 2.5 psia which constitutes approximately 13% of the air treated.

DETAILED DESCRIPTION OF THE INVENTION

Figure 1:
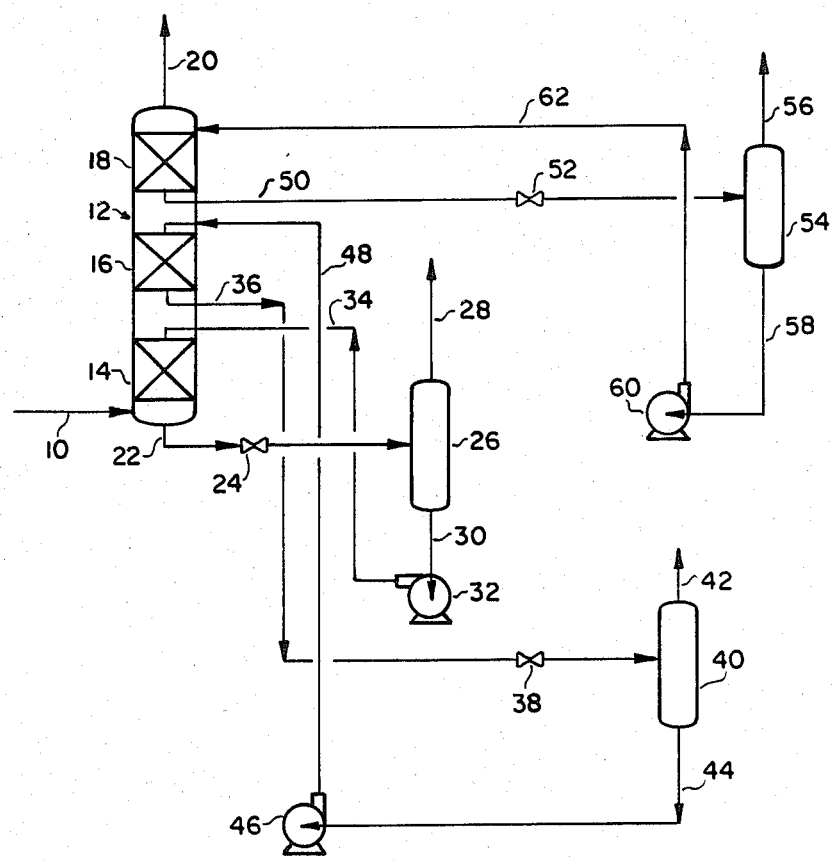
FIG. 1 constitutes a simplified flowscheme of the preferred embodiment of the present invention.

The present invention constitutes an improvement over the prior art related to the chemical separation of air using molten alkali metal salts. This prior art is represented by the above cited U.S. Pat. Nos. 4,132,766, 4,287,170 and 4,340,578, all of which are hereby incorporated by reference into the description of the present invention.

The present invention utilizes multiple absorption-desorption cycles in which air is contacted with an oxygen acceptor and the oxygen acceptor, in an oxidized condition, is regenerated by pressure reduction. The effluent oxygen-depleted stream from each zone of absorption is then directed to the subsequent zone of absorption in order to recover a greater percentage of the oxygen contained in a given quantity of feed air.

The oxygen acceptor, comprised of molten alkali nitrates and nitrites, is contacted with a free oxygen containing gas mixture such as air, under conditions such that it undergoes reaction with part of the free oxygen, yielding a condensed phase oxidized oxygen acceptor. The condensed phase material is readily separated from the exhausting oxygen depleted gas, and then is caused to release its oxygen in relatively pure form by a decomposition reaction. The decomposition reaction is caused to occur by reducing the pressure and/or supplying heat, and may be aided by also supplying a stripping gas. Upon decomposition, the oxidized oxygen acceptor reverts to oxygen acceptor, and the evolved gas, enriched in oxygen content, is collected. Then the cycle is repeated. The prior art discloses both batch and continuous processing modes for chemical air separation, and both modes are applicable to this newly disclosed process. Particularly high energy efficiencies are achieved when the respective oxidation and decomposition reactions are conducted in heat exchange relationship with one another, whereby the exothermic heat from the oxidation reaction supplies the bulk of the heat requirement of the endothermic decomposition reaction.

Preferably the oxygen acceptor constitutes a composition which is liquid and remains liquid when reacted with air at process conditions, and which does not introduce undesirable impurities in the product oxygen. The invention consists of a process which takes advantage of the unique characteristics of the oxygen acceptor, thereby substantially reducing the amount of energy necessary to produce oxygen.

The oxygen acceptor is a molten mixture of alkali metal salts. The salt anion composition includes 50 to 94% nitrate, 4 to 25% nitrite, and 0.5 to 25% combined peroxides and superoxides, where % signifies molar percent. The cation composition includes sodium and potassium in any proportions, preferably between 30% and 70% sodium, balance potassium.

The use of multiple absorption-desorption cycle arrangements in the process of the present invention increases the amount of high and intermediate pressure oxygen recovered from a given quantity of feed air in the chemical separation process of the type set forth herein. In comparison to a single stage absorption-desorption arrangement, the yields of the present invention multiple stage process are as follows:

TABLE 1*

|  | SINGLE STAGE | MULTIPLE STAGE | PRESSURE (psia) |
|---|---|---|---|
| % of $O_2$ in air recovered at high pressure | 14 | 25 | 15 |
| % of $O_2$ in air recovered at intermediate pressure | 38 | 52 | 6 |
| % of $O_2$ in air recovered at low pressure | 38 | 13 | 2.5 |

*All figures are based upon a feed air pressure of 100 psia.

The result of the increased recovery of oxygen at the higher pressures of the various desorption zones is that lower mechanical energy is required for recompression of the oxygen product to a desired level and lower capital costs are incurred for the mechanical equipment involved in the process. Any number of absorption-desorption cycles are theoretically possible, although the preferred embodiment comprises three absorption zones in series with three desorption zones connected in parallel to the respective absorption zones. Alternately, servicing any serial absorption zone may be a desorption zone having a series of desorption stages which should be arranged in parallel with respect to the remaining desorption zones. Absorber pressures ranging from 20 to 600 psia are contemplated and desorber pressures ranging from 2 to 100 psia are contemplated.

In order to provide a better understanding of the present invention, the preferred embodiment will be described with reference to the figures. The preferred embodiment is illustrated in FIG. 1 and should be contrasted with FIG. 3, which illustrates the prior art, in order to appreciate the advantage of, the present invention.

With reference to FIG. 1, the process of the present invention is performed wherein a pressurized and cleaned air feed stream in line 10 is introduced into a multistage absorber 12 with three separate absorption zones 14, 16 and 18. In each zone, the air is passed countercurrently to a molten salt solution of an oxygen acceptor, preferably an alkali metal salt of a nitrite and nitrate mixture. An oxygen-depleted effluent stream is removed from the absorber 12 in line 20. Preferably, this effluent stream would be commercially pure nitrogen. The initial air feed passing through absorption zone 14 is contacted with fresh or regenerated oxygen acceptor. The oxygen acceptor is oxidized in the course of removing oxygen from the air stream. The partially oxygen-depleted stream then passes to the subsequent absorption zone 16. The oxidized oxygen acceptor is removed in line 22 and reduced in pressure rapidly through valve 24 before being introduced into a desorption zone constituting desorber vessel 26. Under the reduced pressure, the oxygen is released from the oxygen acceptor and exits the vessel 26 in overhead line 28. This constitutes high purity, high pressure oxygen product. Preferably it would be available at 15 psia, given a 100 psia feed, and would constitute 25% of the oxygen in the air treated. The reduced oxygen acceptor in its regenerated condition is removed in line 30 and returned at elevated pressure to the absorber 12 by means of pump 32 and line 34.

The initially oxygen-depleted air stream, still containing residual oxygen, is then contacted with a second quantity of oxygen acceptor in the intermediate zone 16 of the absorber 12. Additional oxygen is removed from the air stream and the fresh or regenerated oxygen acceptor is oxidized by this removal step. Further oxygen-depleted air is then passed to the subsequent zone 18 of the absorber 12. The oxidized oxygen acceptor of zone 16 is removed in line 36 and is reduced in pressure rapidly through valve 38. The oxygen acceptor is introduced into a desorption zone comprising a desorber vessel 40 wherein the bound oxygen is removed under the conditions of reduced pressure and exits the vessel 40 in overhead line 42. Preferably, this oxygen would be recovered at 6 psia, for a 100 psia feed, and would constitute 52% of the oxygen in the air treated. The reduced oxygen acceptor in its regenerated form is removed as a bottom stream from vessel 40 in line 44 and is recycled and returned at elevated pressure through pump 46 and line 48 to the intermediate zone 16 of the absorber 12 of the multistage absorption zone of the process.

The further oxygen-depleted air stream then contacts additional fresh and regenerated oxygen acceptor in the third and last absorption zone 18 wherein the air stream is further depleted of oxygen by the oxidation of the oxygen acceptor in a countercurrent flow of these two components. A commercially pure nitrogen is preferably removed from this final zone 18 of the absorber 12 and is recovered as product in line 20. The oxidized oxygen acceptor is removed in line 50 and reduced in pressure rapidly through valve 52 before being introduced into the third desorption zone constituting a desorber vessel 54. Under the conditions of reduced pressure, the bound oxygen is released from the oxygen acceptor and is recovered as an overhead stream in line 56. Preferably, this oxygen is recovered at 2 psia, for a feed stream delivered at 100 psia, and constitutes 13% of the oxygen in the air being treated by the overall system. The reduced oxygen acceptor in its regenerated form is then returned to the absorption zone at its original elevated pressure by pump 60 and line 62, Although not shown, the oxygen products recovered separately from lines 28, 42 and 56 can be combined into one high pressure stream by the staged recompression of the final 56 and intermediate 42 oxygen recovery cycles to the pressure of the initial 28 oxygen recovery cycle. Although preferably each absorption-desorption cycle is performed with the same type of oxygen acceptor comprising a molten mixture of alkali metal salts of nitrite and nitrate along with a minor amount of peroxides and superoxides, it is contemplated that each separate absorption-desorption cycle could constitute an individual and distinct oxygen acceptor solution which is custom blended for the recovery of oxygen at the particular concentration and pressure of each of the stages of the absorption zone.

As indicated by the configuration of the process flow-scheme in FIG. 1, the various stages of absorption are connected in series one to another in order that the air stream flowing through the first absorption zone is then directed through the second absorption zone and finally is directed through the last absorption zone. In contrast to this serial arrangement of absorption zones, the desorption zones are arranged in a parallel and nonserial manner. In other words, each serial absorption zone has its own separate and distinct desorption zone. The oxygen acceptor regenerated in one desorption zone is not communicated with any other desorption zone. This unique configuration of absorption zones and desorption zones provides the enhanced recovery of high pressure oxygen, energy efficiency and capital equipment cost reduction of the present invention.

Figure 2:
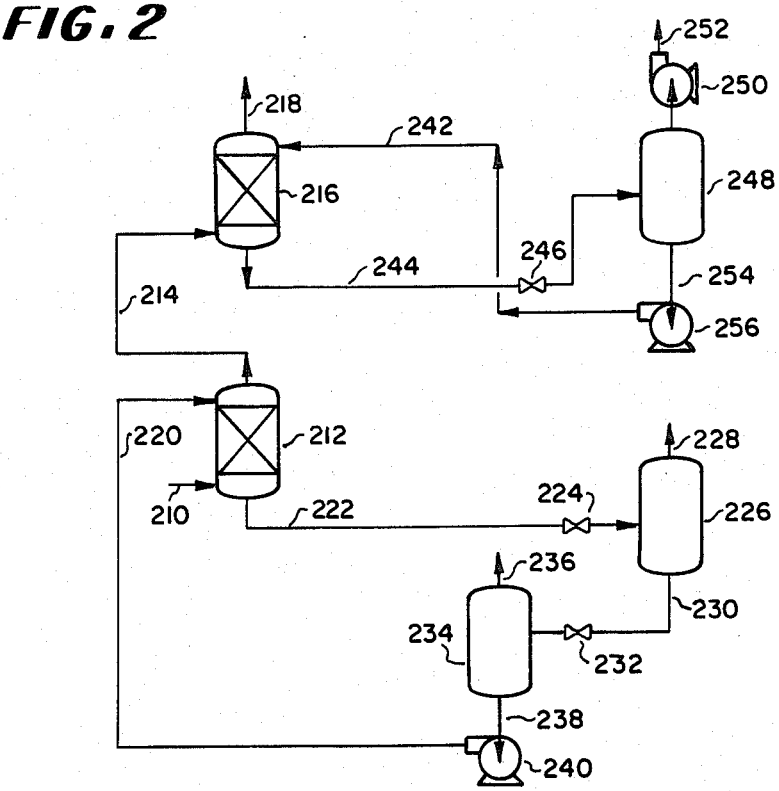
FIG. 2 constitutes a simplified flowscheme of an alternate embodiment of the present invention.

An alternate embodiment from the preferred embodiment of FIG. 1 is shown in FIG. 2. With reference to FIG. 2, an absorption-desorption process for the chemical separation of air is shown wherein distinct absorption zones 212 and 216 are utilized and the parallel desorption zones may include within each cycle a serial arrangement of desorption stages such as 226 and 234. The process would operate in a similar manner to the preferred embodiment, wherein air is introduced at elevated pressure in line 210 into an absorption zone 212 comprising an absorber vessel. A molten alkali metal salt comprising an oxygen acceptor is introduced in line 220 and contacts the air countercurrently in order to become oxidized and separate the oxygen content of the air stream from the nitrogen and residual constituents. The oxygen-depleted effluent is then removed in line 214 for introduction into the second absorption zone 216.

The oxidized oxygen acceptor from absorption zone 212 is removed in line 222 and reduced in pressure rapidly through valve 224. The oxidized oxygen acceptor is partially regenerated in the desorption zone first stage 226 comprising a desorber vessel wherein bound oxygen is removed at the reduced pressure as a gas phase in overhead line 228. The partially regenerated oxygen acceptor is removed as a bottom stream in line 230 and reduced in pressure rapidly to yet a lower pressure level through valve 232 before being introduced into a second serial desorption stage 234 comprising a desorber vessel. The partially regenerated oxygen acceptor at the further reduced pressure is fully regenerated by removal of the residual bound oxygen as a gas phase in line 236 at an intermediate pressure. The fully regenerated oxygen acceptor is removed as a bottom stream in line 238 and pumped to its initial elevated pressure and returned to the absorption zone 212 by way of pump 240 in line 220.

The partially oxygen-depleted feed air stream in line 214 is then contacted a second time with a second stream of oxygen acceptor introduced into the absorption zone 216 in line 242. The oxygen acceptor contacts the oxygen-depleted air stream countercurrently in the absorption stage and a further oxygen-depleted effluent stream is removed in line 218, which preferably constitutes commercially pure nitrogen. The oxidized oxygen acceptor is removed as a bottom stream in line 244 and is reduced in pressure rapidly through valve 246. The low pressure oxidized oxygen acceptor is introduced into the desorption zone 248 comprising a further desorber vessel. Under the reduced pressure, the bound oxygen associated with the oxygen acceptor is released and recovered as an oxygen gas phase in stream 252 wherein the low pressure oxygen may be increased in pressure by a blower compressor 250 to the pressure of the high pressure oxygen recovered in line 228. The regenerated oxygen acceptor is removed in line 254 and returned at its initial pressure by pump 256 and line 242. This alternate embodiment provides some of the advantage of the parallel arrangement of desorption zones with serial absorption zones. However it constitutes a hybrid of the preferred embodiment in FIG. 1 in that the first absorption-desorption cycle of FIG. 2 has a serial arrangement of desorption stages in its desorption zone wherein pressure maintenance of the oxygen product is not maintained as high as could be in the preferred embodiment.

Figure 3:
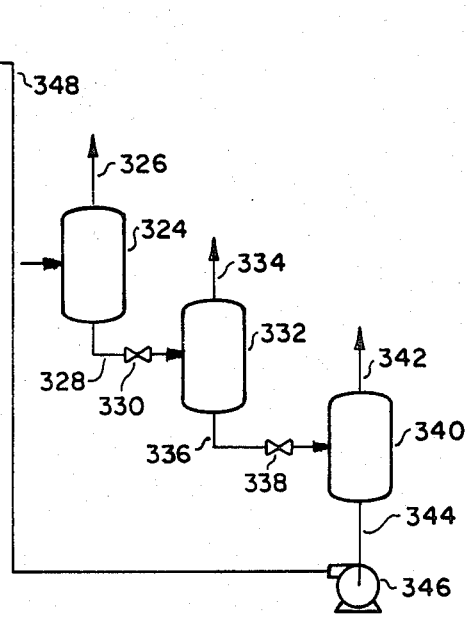
FIG. 3 constitutes a simplified flowscheme of the prior art in chemical air separation.

Both the preferred embodiment of FIG. 1 and the alternate embodiment in FIG. 2 of the present invention should be contrasted with the known operation of the chemical separation of air by molten salt oxygen acceptors, which is illustrated in FIG. 3. In FIG. 3 a single absorption vessel 312 is comprised of serial arrangement of absorption zones 314 and 316 although any number of zones have been taught. Air is introduced in line 310 and the oxygen-depleted effluent is removed in line 318. The oxygen acceptor is introduced in line 348 and the oxidized oxygen acceptor is removed in line 320 and reduced in pressure in a valve 322 before being regenerated at several pressure levels in three desorption zones comprising vessels 324, 332 and 340. After initial regeneration in vessel 324 an oxygen product is recovered in line 326, while the partially regenerated oxygen acceptor is removed in line 328 and reduced in pressure in line 330. At a further reduced pressure in vessel 332 additional oxygen is removed in line 334, while the further regenerated oxygen acceptor is removed in line 336 and reduced in pressure yet again in valve 338. The low pressure oxygen acceptor is completely regenerated in vessel 340 wherein a low pressure oxygen is removed in line 342, while the fully regenerated oxygen acceptor in line 344 is pumped to pressure in pump 346 and returned in line 348.

The distinction between the present invention and the prior art constitutes the opportunity for fresh oxygen acceptor to contact the oxygen content of the feed air stream. In the prior art, as additional stages of absorption are accomplished by a single flow of oxygen acceptor, a diminished capacity to bind oxygen is experienced. The thus oxidized oxygen acceptor must be reduced to succeedingly lower relative pressures to recover a similar amount of oxygen as is recovered in the present invention. Therefore, as can be seen in FIG. 1, separate cycles of fresh oxygen acceptor contact the feed air stream at the various zones of the absorber vessel in order to recover in an efficient manner the maximum amount of oxygen which can be bound with such fresh oxygen acceptor. The recovery of the thus bound oxygen requires less pressure reduction for a given quantity of oxygen which is removed from the feed air stream. In other words, more oxygen can be recovered at the higher level of pressure reduction due to the increased carrying capacity of the oxygen acceptor. This enhanced recovery of oxygen is possible due to the dependence of the chemical air separation process of the present invention on the equilibrium mechanics of the separation which are dependent upon concentrations or partial pressures and the relative pressure levels of the absorption and desorption steps of the cycles.

The present invention has been set forth with reference to several preferred embodiments. Those skilled in the art are deemed to be capable of contemplating various modifications of the recited embodiments and these modifications are deemed to be within the scope of the invention, which scope should be ascertained from the claims which follow.

I claim:

1. In a continuous chemical process for separating air into oxygen and nitrogen in which pressurized air is contacted in an absorption zone with an oxygen acceptor which becomes oxidized. the oxidized oxygen acceptor is separately decomposed by pressure reduction and/or supplying heat in a desorption zone to yield an oxygen product and regenerated oxygen acceptor and the regenerated oxygen acceptor is recycled to the absorption zone characterized in that the pressurized air is separated using the oxygen acceptor in a plurality of staged absorption zones in which each staged zone is connected to a separate desorption zone for the recovery of oxygen product and the regeneration of oxygen acceptor.

2. The process of claim 1 wherein the separation is performed in two absorption zones with attendant desorption zones.

3. The process of claim 2 wherein the first absorption zone has an attendant desorption zone comprising two desorption stages contacted in series in order to recover relatively high pressure oxygen product and relatively intermediate pressure oxygen from the desorption zone.

4. The process of claim 1 wherein a commercially pure nitrogen product is recovered from the final absorption zone.

5. The process of claim 1 wherein the oxygen acceptor comprises a molten solution of alkali metal nitrite and alkali metal nitrate.

6. The process of claim 1 wherein the separation is performed in three absorption zones with attendant separate desorption zones.

7. The process of claim 6 wherein oxygen product is recovered at a high pressure, an intermediate pressure and a low pressure.

8. The process of claim 7 wherein the high pressure oxygen is at approximately 15 psia, the intermediate pressure is at approximately 6 psia and the low pressure oxygen is at approximately 2.5 psia.

9. The process of claim 7 wherein approximately 25% of the oxygen is recovered at high pressure, approximately 52% of the oxygen is recovered at intermediate pressure and approximately 13% of the oxygen is recovered at low pressure.

10. The process of claim 1 wherein the oxygen product recovered from each desorption zone is commercially pure oxygen having a purity of at least 99.5% $O_2$.

11. The process of claim 5 wherein the anion composition includes 50–94% nitrate, 4–25% nitrite and 0.5–25% peroxides and superoxides and the cation composition includes 30–70% sodium with the balance potassium.

* * * * *